United States Patent Office 3,417,108
Patented Dec. 17, 1968

3,417,108
PRODUCTION OF DICARBOXYLIC ACID ANHYDRIDES BY CATALYTIC OXIDATION
Walter J. Stefaniak, Cheektowaga, N.Y., assignor to Allied Chemical Corporation, New York, N.Y., a corporation of New York
No Drawing. Continuation-in-part of application Ser. No. 80,995, Jan. 6, 1961. This application Aug. 25, 1965, Ser. No. 482,614
13 Claims. (Cl. 260—346.4)

ABSTRACT OF THE DISCLOSURE

Production of dicarboxylic acid anhydrides by vapor phase catalytic oxidation of an organic compound in the presence of a catalyst comprising essentially a vanadium oxide and, as a modifier therefor, silver phosphate in an amount equal to at least 2% of the weight of the vanadium oxide, calculated as vanadium pentoxide. The catalyst may optionally include molybdenum oxide and/or uranium oxide, and preferably also contains silver nitrate as an auxiliary promoter.

---

This application is a continuation-in-part of my copending application Serial No. 80,995, filed Jan. 6, 1961, now U.S. Patent 3,277,017.

This invention relates to improvements in the vapor phase catalytic oxidation of organic compounds to dicarboxylic acid anhydrides, and more particularly to the utilization of an improved vanadium oxide catalyst in said process.

The vapor phase oxidation of organic compounds to dicarboxylic acid anhydrides, and especially to maleic and phthalic anhydrides, is a well known commercial process. Although a variety of aromatic compounds such as benzene, toluene, the cymenes, phenol, the cresols, ortho-xylene, naphthalene, and aliphatic hydrocarbons such as butenes have been suggested and used, benzene, naphthalene and ortho-xylene are the principal raw materials for the present day, large scale, manufacturing procedures.

Similarly, of the numerous catalysts suggested for these important commercial syntheses, those based on vanadium oxide are the most widely used. Catalysts composed essentially of vanadium pentoxide are commonly employed for phthalic anhydride preparation, while mixed catalysts composed essentially of vanadium pentoxide-molybdenum trioxide mixtures are employed for maleic anhydride synthesis. The catalysts are generally used on suitable catalytic supports or carriers in conjunction with various other materials which act as promoters or modifiers. They are placed in a suitable chamber, the so-called converter, in which the reaction takes place. A mixture of the organic compound and air or other oxygen-containing gas is passed through the converter wherein the mixture and catalyst are brought into brief and intimate contact at elevated temperatures. Highly exothermic reactions ensue which are customarily controlled by surrounding the converter with an efficient heat exchanging medium such as boiling mercury, molten salt mixtures, and the like.

In general the yields of dicarboxylic acid anhydride obtained in commercial operations are well below theoretical. For example, the oxidation of benzene to maleic anhydride produces yields of from 60 to 85 lbs. of maleic anhydride per 100 lbs. of benzene charged; whereas, the theoretical yield is 125.6 lbs. of maleic anhydride per 100 lbs. of benzene. Besides those catalysts composed essentially of mixtures of vanadium pentoxide and molybdenum trioxide have relatively short-lived periods of efficient operation, when used in the optimum temperature range of 450–550° C., due primarily to volatilization of molybdenum oxide from the catalyst.

It is therefore an object of this invention to provide an improved process for the vapor phase catalytic oxidation of organic compounds to dicarboxylic acid anhydrides.

Another object of this invention is to provide improvements in the vapor phase catalytic oxidation of organic compounds whereby increased yields of dicarboxylic acid anhydride can be obtained at low temperatures and over long periods of operation.

Other objects of the invention in part will be obvious and in part will appear hereinafter.

In accordance with the present invention, vapor phase catalytic oxidation of organic compounds to dicarboxylic acid anhydrides is effected in the presence of a vanadium pentoxide catalyst which contains an effective amount of silver orthophosphate as a modifier.

I have discovered that silver orthophosphate exerts a modifying effect upon the action of vanadium oxide catalysts employed in the vapor phase catalytic oxidation of organic compounds to dicarboxylic acid anhydrides whereby a number of beneficial results are obtained. Thus, the presence of the silver orthophosphate enables the oxidations to be carried out at lower temperatures and with higher yields of dicarboxylic acid anhydrides. Without limiting the invention to any theoretical considerations, it appears that the inclusion of silver orthophosphate in a vanadium oxide oxidation catalyst employed for such oxidations renders the catalyst highly selective, inhibits the condensation of maleic anhydride to dimeric products, and serves to decrease over-oxidation of the anhydride product, possibly by decreasing adsorption or retention of the dicarboxylic acid anhydride by the vanadium oxide catalyst after it has been formed.

The modifying effect of silver orthophosphate on vanadium oxide oxidation catalysts employed for the manufacture of organic dicarboxylic acid anhydrides is especially beneficial in connection with the use of oxidation catalysts which comprise essentially mixtures of vanadium and molybdenum oxides. The invention is accordingly especially concerned with such mixed catalysts. I have found that with such catalyst compositions the process can be operated at optimum conditions at significantly lower temperatures for the production of excellent yields of dicarboxylic acid anhydride at high production capacity. Yields of maleic and phthalic acid anhydrides obtained from benzene, naphthalene, and ortho-xylene in accordance with the present invention are in the range of 85–111 lbs. or more per 100 lbs. of organic compound vapor charged to the catalyst as starting material. Moreover, the inclusion of silver orthophosphate as a modifier in vanadium oxide catalysts containing molybdenum substantially prolongs the useful life of the catalysts.

Thus, I have discovered that, in the manufacture of maleic anhydride by the vapor phase catalytic oxidation of benzene with air in contact with a catalyst comprising a carrier coated with a catalyst mixture of the type set out in Example II below (comprising essentially a mixture of vanadium and molybdenum oxides and small amounts of uranium oxide, silver orthophosphate and silver oxide) the catalyst has a useful life of about two years in large scale commercial manufacture; whereas a known similar catalyst containing similar amounts of vanadium, molybdenum and uranium oxides and a small amount of sodium phosphate as modifier (instead of the silver orthophosphate and silver oxide of the catalyst of Example II) has a useful life of about six months in such commercial manufacture. Moreover, the catalyst containing the silver orthophosphate operates at temperatures about 30° C. lower and produces a higher yield of maleic anhydride than said known catalyst containing sodium phosphate. These advantages result in an increased production of maleic anhydride of more than 200 percent in pounds of benzene oxidized per pound of catalyst used and with greater efficiency as measured by the yield of maleic anhydride obtained.

Molybdenum modified catalysts have been used for the production of maleic anhydride but have not been used commercially for phthalic anhydride manufacture, so far as I am aware. The molybdenum-containing modified catalysts have been found to be effective, in accordance with the present invention, for the manufacture of phthalic anhydride, and have been found to produce superior yields of the latter compound from ortho-xylene and naphthalene in comparison with known catalysts. The superiority is particularly notable in the case of ortho-xylene.

A catalyst particularly useful for the manufacture of dicarboxylic acid anhydrides in accordance with the present invention comprises a suitable support, e.g., fused alumina, ceramically bonded silicon carbide, and the like, containing thereon vanadium oxide and a modifying amount of silver orthophosphate. Preferably, the catalytic mixture also contains an auxiliary promoter, a number of which are known in this art. A particularly advantageous promoter is silver oxide, which is advantageously incorporated into the catalyst mixture in the form of silver nitrate. Other auxiliary promoters which can be used in addition to, or in place of silver oxide, are the oxides of cerium, cobalt, tin, and the like.

A particularly advantageous catalyst for use in the practice of the present invention comprises a suitable carrier or support (such as one of those referred to above) containing thereon a mixture of vanadium and molybdenum oxides, silver orthophosphate as a modifier, and preferably silver oxide or other auxiliary promoter, with or without a small amount of uranium oxide.

The vanadium is preferably incorporated into the catalyst as vanadium pentoxide, and when molybdenum is employed it is preferably incorporated into the catalyst as molybdenum trioxide. Since these compounds may be partially reduced during the oxidation, so that the active catalyst is probably a mixture of vanadium oxides (and of molybdenum oxides), in the further description of the invention and in the claims, the proportions of the components are set out in terms of vanadium and/or molybdenum oxides calculated as vanadium pentoxide and molybdenum trioxide. Accordingly where vanadium pentoxide and/or molybdenum trioxide are referred to, it will be understood that such calculated basis is intended. Similarly, uranium oxide is calculated in terms of uranium dioxide; and silver is calculated in terms of silver oxide, even though it may be present in the catalyst initially in the form of silver nitrate and decompose to silver oxide during the oxidation process.

The amount of silver orthophosphate present in the vanadium oxide catalysts employed in the practice of the present invention can be varied over a considerable range. Catalysts containing at least about 2% of the weight of the vanadium pentoxide present (calculated basis) are employed in order to secure a significant modifying effect, especially in the absence of an auxiliary promoter, and the amount may range up to the weight of the vanadium pentoxide, or higher.

The proportions of vanadium oxide, and/or other components when present in the catalyst mixture, also can be varied. Thus, in the supported modified mixed catalysts containing vanadium and molybdenum oxides, the proportions by weight of vanadium pentoxide to molybdenum trioxide (on the above calculated basis) present in the catalyst mixture carried by the support may range from 15:1 to 1:2 (that is, vanadium pentoxide may be about 93% to about 33% by weight of the vanadium pentoxide-molybdenum trioxide mixture and molybdenum trioxide may be about 7% to about 67% by weight of the mixture), and the amount of silver orthophosphate may range from .2% to 60% by weight of the vanadium pentoxide present (calculated basis). The catalyst may also contain up to 5% (by weight of the catalyst mixture) of uranium oxide, calculated as $UO_2$. Preferred supported modified catalysts for use in the practice of the present invention contain about 60% to about 85% of vanadium pentoxide and about 0.5% to about 1.5% of uranium dioxide, by weight of the catalyst mixture carried by the support, an amount of silver orthophosphate equal to about 4% to about 40% of the weight of the vanadium pentoxide in said catalyst, and the remainder molybdenum trioxide.

Silver orthophosphate is preferably employed together with an auxiliary promotor, particularly silver oxide, in which case larger amounts of silver orthophosphate up to 100% or higher based on the weight of the vanadium pentoxide, can be employed. When silver oxide is included in the catalyst an amount equal to about one-half the weight of the silver orthophosphate is preferably used.

The following examples describe specific embodiments of the invetnion and illustrate the best method contemplated for carrying it out; but they are not to be interpreted as limiting the invention to all details thereof, since changes can be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

EXAMPLE I

A. Preparation of catalyst

A solution of 94.5 parts of vanadium pentoxide in 1200 parts of distilled water and about 106 parts of 28° Bé. aqua ammonia was agitated and heated to 80 to 85°. A slow steady stream of sulfur dioxide was passed into the solution for four hours to reduce the oxide. Then 37 parts of ammonium molybdate were added, and the reaction was continued for one-half hour. The mixture was evaporated to about one-half its volume, and then diluted with water back to the original volume. To this mixture was added 106 parts of 28° Bé. aqua ammonia and 15 parts of ammonium metavanadate. In separate vessels, 2.47 parts of uranyl nitrate hexahydrate were dissolved in 50 parts of water, and 1.15 parts of ammonium metavanadate were dissolved in 75 parts of water. The latter solution was heated to 85°, and the former solution was added to the hot solution. After about 30 minutes, the mixed solutions were added to the main slurry, and then 5.52 parts of silver phosphate were added. The mixture was agitated to 80 to 85° and 600 parts of "Alundum" Al–38 (porous fused alumina), 6 to 8 mesh granules were added. The water was then removed by evaporation. The resulting coated granules had the following composition by weight:

| | Percent |
|---|---|
| $V_2O_5$ | 72.6 |
| $MoO_3$ | 22.4 |
| $UO_2$ | 0.9 |
| $Ag_3PO_4$ | 4.1 |

B. Maleic anhydride production

A tubular, mercury-cooled converter of conventional design, the tubes of which were loaded with the catalyst prepared as in A above (3″ blank, 16″ catalyst) was used to test the efficiency of the catalyst. Benzene-air mixtures were passed through the converter while maintaining operating conditions as indicated in the table below. The exit gases were passed into a water scrubber and the maleic acid content of the scrubbings was determined. These results are from runs conducted for about 20 hours' duration. The results are given in Table I below. The yields of maleic acid are based on the weight of benzene vapor charged to the converter.

TABLE I

| Benzene, g./hr. | Total Grams Vaporized | Air, g./hr. | Air/Benzene Ratio | Catalyst, Avg. Peak Temperature | Maleic Acid Produced, g. | Maleic Acid, Lbs. per 100 Lbs. Benzene |
|---|---|---|---|---|---|---|
| 38.7 | 910 | 2,045 | 53 | 505 | 895 | 98.5 |
| 73.5 | 1,470 | 2,120 | 28.8 | 500 | 1,456 | 99.0 |
| 76.5 | 1,525 | 2,130 | 27.9 | 460 | 1,450 | 95.0 |
| 72.2 | 1,300 | 2,145 | 29.7 | 495 | 1,280 | 98.3 |
| 74.5 | 1,490 | 2,050 | 27.5 | 500 | 1,487 | 99.8 |

EXAMPLE II

A. Catalyst preparation

A solution of 94.5 parts of "Orange Salt" (containing 85.5 parts $V_2O_5$) in 1200 parts of distilled water and 106 parts of 28° Bé. aqua ammonia was agitated and heated to 80° to 85°. Sulfur dioxide was passed into the mass for 4 hours, and after the addition of 37 parts of ammonium molybdate, the sulfur dioxide was added 30 minutes longer. The excess sulfur dioxide was expelled by evaporating the mixture to about one-half its volume, and thereafter the mixture was diluted with water back to the original volume. To this mixture were added 106 parts of 28° Bé. aqua ammonia and 15 parts of ammonium metavanadate.

Uranyl vanadate was prepared by dissolving 2.47 parts of uranyl nitrate in 50 parts of hot (85°) water and adding to the solution a hot (85°) solution of 1.15 parts of ammonium metavanadate in 75 parts of water. The mixture was permitted to stand for 15 minutes and then added to the above reduced mixture. The resulting mixture was agitated for 10 minutes, and then to it was added a solution of 8.25 parts of silver phosphate and 3.35 parts of silver nitrate dissolved in 45 parts of 28° Bé. aqua ammonia.

The combined mixture was transferred to a coater and evaporated therein to about ⅓ its volume.

Then 600 parts of 3/16" x 3/16" pellets of "Alundum" (mix Al–746, product of the Norton Co.) were charged and the mixture was evaporated to dryness. The mass was cooled slowly and then screened to remove coarse and fine particles.

The resulting coating composition had the following approximate composition by weight:

|  | Percent |
|---|---|
| $V_2O_5$ | 69.5 |
| $MoO_3$ | 21.4 |
| $UO_2$ | 0.94 |
| $AgNO_3$ | 2.39 |
| $AgPO_4$ | 5.87 |

B. Maleic anhydride production

The catalyst prepared in part A above was charged to a tubular converter as in Example I, part B, above. Benzene-air mixtures were oxidized in this converter in a manner similar to that of said Example I. The results of a series of runs (about 20 hours each) are given in Table II below.

TABLE II

| Benzene | | Air, gms./hr. | Air/Benzene Ratio | Catalyst, Avg. Peak Temperature | Maleic Acid Produced, g. | Maleic Acid, Lbs./100 Lbs. Benzene |
|---|---|---|---|---|---|---|
| Total Grams Vaporized | Gms./hr. | | | | | |
| 180 | 9.0 | 757 | 84.0 | 422 | 178 | 99.2 |
| 191 | 9.6 | 775 | 84.5 | 424 | 202 | 105.9 |
| 195 | 9.8 | 761 | 78.1 | 415 | 199 | 101.9 |
| 172 | 8.6 | 775 | 90.2 | 410 | 166 | 96.5 |
| 282 | 14.2 | 768 | 54.5 | 470 | 316 | 111.8 |
| 294 | 14.7 | 1,185 | 80.7 | 480 | 315 | 107.2 |
| 390 | 19.5 | 743 | 48.2 | 520 | 417 | 107.0 |
| 330 | 16.5 | 815 | 49.3 | 500 | 370 | 111.8 |
| 297 | 14.8 | 818 | 44.5 | 505 | 311 | 105.0 |
| 330 | 16.5 | 822 | 49.8 | 530 | 342 | 103.5 |
| 327 | 16.3 | 795 | 48.7 | 520 | 350 | 107.0 |
| 334 | 16.6 | 805 | 48.3 | 536 | 345 | 103.3 |
| 336 | 16.7 | 797 | 47.3 | 536 | 357 | 106.5 |

EXAMPLE III

A. Catalyst preparation

The catalyst was prepared in the same manner as in Example II, part A except that the addition of silver orthophosphate was omitted.

B. Maleic anhydride production

The catalyst prepared in part A above was charged to a tubular converter as in Example I, part B, above. Benzene-air mixtures were oxidized in this converter in a manner similar to that of said Example I. The results of a series of runs (about 20 hours each) are given in Table III below.

TABLE III

| Benzene | | Air, gms./hr. | Air/Benzene Ratio | Catalyst, Avg. Peak Temperature | Maleic Acid Produced, g. | Maleic Acid, Lbs./100 Lbs. Benzene |
|---|---|---|---|---|---|---|
| Total Grams Vaporized | Gms./hr. | | | | | |
| 170 | 9.44 | 673.4 | 71.3 | 402 | 135.1 | 79.5 |
| 190 | 9.50 | 671.4 | 70.7 | 415 | 135.1 | 71.1 |
| 213 | 10.7 | 633.1 | 59.4 | 430 | 152.0 | 71.4 |
| 203 | 10.2 | 672.8 | 66.3 | 460 | 170.1 | 83.8 |
| 300 | 15.0 | 800.0 | 53.3 | 480 | 208.0 | 69.4 |
| 188 | 9.4 | 818.8 | 87.1 | 424 | 160.8 | 85.6 |

EXAMPLE IV

A. Catalyst preparation

The catalyst was prepared in the same manner as in Example II, part A, except that 13.40 parts of silver nitrate were added instead of 8.25 parts of silver orthophosphate and 3.35 parts of silver nitrate. This quantity of silver nitrate (13.40 parts) contains the same amount of silver as is contained in 8.25 parts of silver orthophosphate and 3.35 parts of silver nitrate.

B. Maleic anhydride production

The catalyst prepared in part A above was charged to a tubular converter as in Example I, part B above. Benzene-air mixtures were oxidized in this converter in a manner similar to that of said Example I. The results of a series of runs (about 20 hours each) are given in Table IV below.

TABLE IV

| Benzene | | Air, gms./hr. | Air/ Benzene Ratio | Catalyst, Avg. Peak Temperature | Maleic Acid Produced, g. | Maleic Acid/ 100 Lbs. Benzene |
|---|---|---|---|---|---|---|
| Total Grams Vaporized | Gms./hr. | | | | | |
| 202 | 10.1 | 670.7 | 66.4 | 455 | 170.1 | 84.2 |
| 203 | 10.2 | 824.4 | 81.2 | 440 | 177.3 | 87.3 |
| 299 | 16.6 | 688.0 | 41.4 | 540 | 253.3 | 84.7 |
| 338 | 16.9 | 797.5 | 47.2 | 510 | 271.4 | 80.3 |
| 495 | 24.8 | 1,113.9 | 45.0 | 580 | 375.8 | 75.9 |

EXAMPLE V

A. Catalyst preparation

The catalyst was prepared in the same manner as in Example II, part A.

B. Phthalic anhydride production

A tubular, molten salt-cooled converter of conventional design was loaded with the catalyst as prepared in Example V, part A, above. Napththalene-air mixtures were passed through the converter, and product gas samples were condensed to recover oxidation products for analysis. Similarly, orthoxylene was passed through the converter under the same reaction conditions. The results obtained are given in Table V below.

TABLE V

| Starting Material, g./hr. | Air, g./hr. | Air/ Hydrocarbon Ratio | Catalyst, Maximum Temp. | Phthalic Anhydride, lbs. per 100 lbs. Starting Material |
|---|---|---|---|---|
| 215–252 a | 8,130–9,430 | 37.6 | 525 | 96 |
| 181–209 b | 8,130–9,430 | 45.0 | 525 | 88 | a Naphthalene.
b Ortho-xylene.

EXAMPLE VI

A. Catalyst preparation

A coated granular catalyst, of which the coating had the following approximate composition by weight, was prepared substantially in the manner described in Example II, part A, above:

|  | Percent |
|---|---|
| $V_2O_5$ | 59.2 |
| $MoO_3$ | 18.0 |
| $UO_2$ | 0.82 |
| $AgNO_3$ | 2.17 |
| $Ag_3PO_4$ | 1 19.8 |

1 I.e., 33.4 percent of the weight of the vanadium pentoxide.

B. Maleic anhydride production

The catalyst of part A above was charged to a tubular converter of the type employed in above Example I, part B, but in which the catalyst bed was 64 inches, and benzene-air mixtures were passed through the converter while maintaining operating conditions as indicated in the Table VI below. The exit gases were passed into a water scrubber and the maleic acid content of the scrubbings were determined. The results are given in Table VI below. While the yields of maleic acid per 100 pounds of benzene charged to the converter obtained in the runs of Table VI are not as high as in the case of Example II, the yields of maleic acid per 100 pounds of benzene consumed in a number of the runs of Table VI were substantially theoretical.

TABLE VI

| Benzene | | A/R g./hr. | Air/ Benzene Ratio | Catalyst Average Peak Temp. | Maleic Acid, Lbs. per 100 Lbs. of Benzene Charged |
|---|---|---|---|---|---|
| G./hr. | Total Grams Vaporized | | | | |
| 215.6 | 3,880 | 7,514.2 | 34.9 | 406 | 52.4 |
| 250.0 | 4,500 | 7,407.1 | 29.6 | 399 | 42.8 |
| 251.9 | 4,535 | 7,479.5 | 29.7 | 401 | 37.3 |
| 251.6 | 4,530 | 7,549.4 | 30.0 | 415 | 42.6 |
| 129.7 | 2,335 | 4,027.8 | 31.1 | 425 | 45.8 |
| 103.4 | 1,862 | 3,789.7 | 36.6 | 437 | 53.2 |
| 92.1 | 1,659 | 3,804.6 | 41.3 | 415 | 43.9 |
| 121.5 | 2,367 | 3,841.2 | 29.2 | 452 | 51.3 |
| 129.2 | 2,326 | 3,744.7 | 29.0 | 466 | 54.0 |
| 226.3 | 4,073 | 7,079.4 | 31.3 | 481 | 37.3 |

EXAMPLE VII

A. Catalyst preparation

The catalyst was prepared in substantially the same manner as in Example II, part A. 700 grams of granules of "Alundum" Al–38 (4 to 6 mesh in size) were employed instead of the "Alundum" set out in Example II, part A.

The resulting coating had the following approximate percent composition by weight (in terms of $V_2O_5$, $MoO_3$, $UO_2$, $AgNO_3$ and $Ag_3PO_4$):

| | |
|---|---|
| $V_2O_5$ | 69.5 |
| $MoO_3$ | 21.4 |
| $UO_2$ | 0.9 |
| $AgNO_3$ | 2.4 |
| $Ag_3PO_4$ | 5.9 |

B. Maleic anhydride production

The catalyst was employed in the conversion of benzene to maleic anhydride in a fixed bed, tubular converter 10 feet in length, cooled by indirect contact with a circulating molten salt mixture consisting of potassium nitrate and sodium nitrite in the proportions of 600:522 by weight and having a melting point of 142°. The converter was charged with about a 2-foot layer of uncoated granules of the "Alundum" (2 to 2½ mesh in size) followed by about a 5 foot 4 inch layer of the catalyst, and topped by about a 2 foot 8 inch layer of the uncoated "Alundum" granules (2 to 2½ mesh). A mixture of benzene vapor and air was passed upward through the catalyst, and the maximum temperature of the catalyst was measured by thermocouples in the usual manner. Hourly readings were taken throughout each run. The exit gases from the converter were absorbed in water, and the total yield of maleic acid was determined at the completion of each run. The results of a series of runs are given in Table VII below.

TABLE VII

| Hours | Benzene, g./hr. | Air, g./hr. | Air/ Benzene Ratio | Catalyst Avg. Peak Temperature | Maleic Acid, Lbs./100 Lbs. Benzene Charged |
|---|---|---|---|---|---|
| 24 | 304 | 10,220 | 33.4 | 495 | 103.7 |
| 18 | 300 | 10,250 | 34.2 | 540 | 101.3 |
| 16 | 339 | 9,940 | 29.3 | 553 | 103.7 |

TABLE VIII

| Hours | Benzene, g./hr. | Air, g./hr. | Air/Benzene Ratio | Catalyst Avg. Peak Temperature | Maleic Acid, Lbs./100 Lbs. Benzene Charged |
|---|---|---|---|---|---|
| 20 | 215 | 10,000 | 46.5 | 450 | 57.0 |
| 24 | 203 | 10,050 | 49.7 | 465 | 68.7 |
| 18 | 328 | 10,000 | 30.5 | 500 | 71.0 |
| 20 | 340 | 9,825 | 28.9 | 460 | 64.0 |
| 24 | 321 | 9,500 | 29.5 | 460 | 69.0 |
| 24 | 327 | 10,570 | 32.4 | 460 | 72.8 |

EXAMPLE VIII

A. Catalyst preparation

The catalyst was prepared in the same manner as in Example VII, part A, but without the addition of the ammonium molybdate and uranyl vanadate. The resulting coating had the following approximate percent composition (in the same terms as above):

$V_2O_5$ ---------------------------------------- 89.3
$AgNO_3$ ---------------------------------------- 3.1
$Ag_3PO_4$ ---------------------------------------- 7.6

B. Maleic anhydride production

The catalyst prepared in part A above was charged to a tubular converter as in Example VII (part B) above. Benzene-air mixtures were oxidized in the converter in a manner similar to that of said example. The results of a series of runs are given in Table VIII above.

EXAMPLE IX

A. Catalyst preparation

The catalyst was prepared in the same manner as in Example VII, part A, but without the addition of the uranyl vanadate. The resulting coating had the following approximate percent composition (in the same terms as above):

$V_2O_5$ ---------------------------------------- 70
$MoO_3$ ---------------------------------------- 21.6
$AgNO_3$ ---------------------------------------- 2.4
$Ag_3PO_4$ ---------------------------------------- 5.9

B. Maleic anhydride production

The results of a series of runs obtained with the resulating catalyst when employed in the manner of Example VIII, part B, are given in Table IX below.

EXAMPLE X

A. Catalyst preparation

The catalyst was prepared in the same manner as in Example VII, part A, but without the addition of the uranyl vanadate and silver nitrate. The resulting coating had the following approximate percent composition (in the same terms as above):

$V_2O_5$ ---------------------------------------- 71.8
$MoO_3$ ---------------------------------------- 22.1
$Ag_3PO_4$ ---------------------------------------- 6.1

B. Maleic anhydride production

The catalyst thus prepared was charged to a tubular converter as in Example VII (part B) above. Benzene-air mixtures were oxidized in the converter in a manner similar to that of said example. The results of a series of runs are given in Table X above.

For purposes of comparison catalyst containing, respectively, vanadium oxide as essentially the sole coating component and a mixture of vanadium and molybdenum oxides as essentially the sole coating components were prepared and employed in a manner similar to the latter catalysts.

The vanadium oxide catalyst was prepared by the first part of the process employed for preparation of the catalyst of Example II (part A), up to completion of the sulfur dioxide reduction, expulsion of the excess sulfur dioxide, and dilution of the mixture to its original volume. The mixture was then transferred to the coater, and "Alundum" granules were coated and further treated in the same manner as in Example VII, part A. The resulting coating was essentially $V_2O_5$.

The vanadium oxide-molybdenum oxide catalyst was prepared in the same manner as in Example VII, part A, but without the addition of the uranyl vanadate, silver phosphate and silver nitrate. The resulting coating had the following approximate percent composition (in the same terms as above):

$V_2O_5$ ---------------------------------------- 76.5
$MoO_3$ ---------------------------------------- 23.5

TABLE IX

| Hours | Benzene, g./hr. | Air, g./hr. | Air/Benzene Ratio | Catalyst Avg. Peak Temperature | Maleic Acid, Lbs./100 Lbs. Benzene Charged |
|---|---|---|---|---|---|
| 24 | 321 | 9,850 | 30.7 | 520 | 94 |
| 17 | 300 | 10,100 | 34.7 | 510 | 77.2 |
| 24 | 321 | 10,000 | 31.1 | 560 | 101.0 |
| 24 | 316.5 | 10,100 | 32.1 | 535 | 96 |
| 18 | 318 | 10,100 | 31.7 | 560 | 108.7 |
| 18 | 340 | 9,925 | 29.3 | 510 | 102.7 |

TABLE X

| Hours | Benzene, g./hr. | Air, g./hr. | Air/Benzene Ratio | Catalyst Avg. Peak Temperature | Maleic Acid, Lbs./100 Lbs. Benzene Charged |
|---|---|---|---|---|---|
| 22 | 228 | 9,965 | 43.7 | 465 | 89.5 |
| 24 | 265 | 10,000 | 37.8 | 520 | 98.3 |
| 24 | 324 | 10,000 | 30.9 | 480 | 101.0 |
| 22 | 320 | 10,100 | 31.5 | 550 | 103.7 |

The catalysts thus prepared were each employed in the manner of Example VII, part B, for the oxidation of benzene to maleic anhydride. The results of a series of runs with the vanadium oxide catalyst are given in Table XI below; and the results of a series of runs with the vanadium oxide-molybdenum oxide catalyst are given in Table XII below.

TABLE XI

| Hours | Benzene, g./hr. | Air, g./hr. | Air/Benzene Ratio | Catalyst Avg. Peak Temperature | Maleic Acid, Lbs./100 Lbs. Benzene Charged |
|---|---|---|---|---|---|
| 20 | 380 | 9,960 | 35 | 440 | 62.5 |
| 24 | 326 | 9,930 | 20.6 | 470 | 64.3 |
| 24 | 355 | 9,960 | 28.1 | 475 | 62.8 |
| 24 | 357 | 9,900 | 27.8 | 460 | 65.5 |
| 24 | 355 | 9,925 | 28.0 | 450 | 65.7 |

TABLE XII

| Hours | Benzene, g./hr. | Air, g./hr. | Air/Benzene Ratio | Catalyst Avg. Peak Temperature | Maleic Acid, Lbs./100 Lbs. Benzene Charged |
|---|---|---|---|---|---|
| 20 | 159 | 10,330 | 65 | 472 | 72.2 |
| 24 | 241 | 10,200 | 42.2 | 494 | 80.6 |
| 24 | 312 | 10,000 | 32 | 510 | 81.3 |
| 24 | 336 | 9,960 | 29.7 | 405 | 84.0 |
| 24 | 345 | 9,960 | 28.9 | 414 | 76.7 |
| 24 | 365 | 9,970 | 27.8 | 445 | 77.3 |

While the above describes the preferred embodiments of the invention, it will be understood that departures can be made therefrom within the scope of the invention.

Although the principles of the present invention are illustrated above by reference to the oxidation of benzene, naphthalene, and ortho-xylene it is evident that other aromatic compounds can be used to similar advantage. Moreover, although catalysts used for the oxidation of aromatic compounds are not directly interchangeable with those used for the oxidation of butenes, $V_2O_5$-$MoO_3$ forms the basis for both catalysts and silver orthophosphate can improve the oxidation of butene in the same fashion as in the oxidation of the benzene, ortho-xylene and toluene.

Thus, the process is not limited to the oxidation of the starting materials employed in the specific examples, but may be employed for the oxidation of other organic compounds to dicarboxylic acid anhydrides, such as those referred to above.

While I do not wish to be bound by any theoretical explanation, the presence of silver oxide (originally as silver nitrate) in the modified catalyst appears to result in an acceleration of the oxidation of benzene to maleic anhydride and permits oxidation at a lower temperature without change in other operating conditions. In the absence of silver nitrate (silver oxide), the main oxidation of benzene to maleic anhydride occurs at a lesser rate.

The difference in action between silver orthophosphate and silver nitrate, and the advantage of their preferred conjunctive use, are clearly demonstrated by the above specific examples. Thus, the yield of maleic acid is significantly lowered from 96.5–111.8 lbs. to 71.1–87.3 lbs. of maleic acid per 100 lbs. of benzene charged, when silver orthophosphate is omitted from the catalyst even if the amount of silver (as silver nitrate) is increased to the total amount present in the form of silver orthophosphate and silver nitrate (Example IV).

Other auxiliary promoters can be used in addition to, or in place of, the silver oxide (silver nitrate), such as the oxides of cerium, cobalt, tin and the like. When such an auxiliary promoter is used, the amount thereof, calculated as the oxide, can be varied from about 1 to about 30, preferably about 1 to about 15 percent, of the weight of $V_2O_5$ present.

Furthermore, the invention is not limited to the operation of the oxidation process under the conditions employed in the above specific examples. Thus, the oxidation can be carried out at catalyst temperatures ranging from about 400° to about 600° C.; and the proportions of air or other oxygen-containing gas relative to the starting material employed, as well as the time of contact between the vapor mixture and the catalyst, can be varied in accordance with the known practice in the art. The inclusion of silver orthophosphate in the catalyst renders the catalyst selective, as pointed out above, and thereby permits selection of optimum operating conditions for the particular reaction being carried out.

I claim:

1. A process for the vapor phase catalytic oxidation of an organic compound to a dicarboxylic acid anhydride which comprises contacting, at an elevated temperature, a mixture of vapors of said organic compound and an oxygen-containing gas with a catalyst comprising essentially vanadium oxide and, as a modifier therefor, silver orthophosphate in an amount equal to at least 2% of the weight of the vanadium oxide, calculated as vanadium pentoxide.

2. In a process for the vapor phase catalytic oxidation of an organic compound to a dicarboxylic acid anhydride wherein a mixture of vapors of said organic compound and an oxygen-containing gas is contacted at an elevated temperature with a catalyst, the improvement which comprises carrying out the vapor phase oxidation in contact with a catalyst comprising a support carrying a vanadium oxide catalyst comprising essentially vanadium oxide and, as a modifier therefor, silver orthophosphate in an amount equal to 2% to 60% of the weight of the vanadium oxide, calculated as vanadium pentoxide.

3. A process as claimed in claim 2 in which the vanadium oxide catalyst comprises essentially a mixture of vanadium oxide, silver orthophosphate and silver oxide, the amount of silver oxide being equal to 1% to 30% of the weight of the vanadium oxide, calculated as vanadium pentoxide.

4. A process as claimed in claim 3 wherein the vanadium oxide catalyst includes molybdenum oxide.

5. A process as claimed in claim 2, wherein the vanadium oxide catalyst includes a mixture of vanadium and molybdenum oxides in proportions corresponding to a $V_2O_5$:$MoO_3$ ratio of from 15:1 to 1:2.

6. A process as claimed in claim 5, wherein the catalyst also contains uranium oxide in an amount equal to 0.5% to 1.5% of the weight of the vanadium oxide catalyst.

7. In a process for the manufacture of a dicarboxylic acid anhydride selected from the group consisting of maleic acid anhydride and phthalic acid anhydride by the vapor phase catalytic oxidation of an organic compound selected from the group consisting of benzene, naphthalene and ortho-xylene at an elevated temperature in contact with a vanadium oxide catalyst, the improvement which comprises carrying out the vapor phase oxidation in contact with a vanadium oxide catalyst comprising a carrier coated with a mixture comprising essentially vanadium and molybdenum oxides in proportions corresponding to a $V_2O_5$:$MoO_3$ ratio of from 15:1 to 1:2, by weight, and as a modifier therefor, silver orthophosphate in an amount at least 2% of the weight of the vanadium oxide calculated as vanadium pentoxide.

8. A process as claimed in claim 7 in which the catalyst coating also contains uranium oxide in an amount equal to 0.5% to 1.5% of the weight of the vanadium oxide calculated as vanadium pentoxide.

9. A procses as claimed in claim 8 in which the catalyst coating also contains silver oxide in an amount equal to 1% to 30% of the weight of the vanadium oxide calculated as vanadium pentoxide.

10. In a process for the manufacture of a dicarboxylic acid anhydride selected from the group consisting of maleic acid anhydride and phthalic acid anhydride by the vapor phase catalytic oxidation of an organic compound selected from the group consisting of benzene, naphthalene and orthoxylene at an elevated temperature in contact with a vanadium oxide catalyst, the improvement which comprises carrying out the vapor phase oxidation in contact with a catalyst comprising a carrier coated with a mixture comprising essentially vanadium pentoxide and, as a modifier, silver orthophosphate in an amount equal to at least 2 percent of the weight of the vanadium pentoxide present.

11. A process as claimed in claim 10 wherein the catalyst comprises an aluminum oxide carrier coated with a catalyst coating comprising essentially a mixture of vanadium oxide, molybdenum oxide, silver orthophosphate, and silver oxide in amounts corresponding to a weight ratio of vanadium pentoxide to the catalyst coating of from about 60 to about 85 percent, and a weight ratio of silver orthophosphate to vanadium pentoxide of at least 2 percent and a weight ratio of silver oxide to vanadium pentoxide of 1 to 15 percent.

12. A process as claimed in claim 10 wherein the catalyst comprises a porous fused aluminum oxide carrier coated with a catalyst coating comprising essentially a mixture of vanadium oxide, molybdenum oxide, uranium oxide and silver orthophosphate in amounts corresponding to a weight ratio of vanadium pentoxide to the catalyst coating of from about 60 to about 85 percent, a weight ratio of uranium dioxide to the catalyst coating of about 1 percent, and a weight ratio of silver orthophosphate to vanadium pentoxide of at least 2 percent.

13. A process as claimed in claim 12 wherein the coating contains an amount of silver orthophosphate corresponding to a weight ratio of silver orthophosphate to vanadium pentoxide of from 4% to 40%, and an amount of silver oxide corresponding to a weight ratio of silver oxide to vanadium pentoxide of from about 1% to about 15%.

References Cited

UNITED STATES PATENTS 2,773,921  12/1956  Rylander et al. ------ 252—435

NICHOLAS S. RIZZO, *Primary Examiner.*

B. DENTZ, *Assistant Examiner.*

U.S. Cl. X.R.

260—346.8; 252—437

UNITED STATES PATENT OFFICE
CERTIFICATE OF CORRECTION

Patent No. 3,417,108　　　　　　　　　　　　　　　　　　　December 17, 1968

Walter J. Stefaniak

It is certified that error appears in the above identified patent and that said Letters Patent are hereby corrected as shown below:

Column 9, TABLE IX, fifth column, line 4 thereof, "535" should read -- 525 --. Column 12, line 21, after "compound" insert -- selected from the group consisting of benzene, toluene, cymene, phenol, cresol, ortho xylene, naphthalene and butene --; lines 22, 33 and 60, and column 13, line 18, after "temperature", each occurrence, insert -- between about 400° C. to about 600° C.--. Column 12, line 2 after "comprising" insert -- a support carrying a vanadium oxide catalyst comprising --; line 26, cancel "at least 2%" and insert -- 2% to 60% --; line 30, after "compound" insert -- selected from the group consisting of benzene, toluene, cymene, phenol, cresol, ortho xylene, naphthalene and butene --.

Signed and sealed this 24th day of March 1970.

(SEAL)

Attest:

Edward M. Fletcher, Jr.　　　　　　　　　　　　　　WILLIAM E. SCHUYLER, JR.
Attesting Officer　　　　　　　　　　　　　　　　　　Commissioner of Patents